United States Patent
Sheikh et al.

(10) Patent No.: US 6,202,160 B1
(45) Date of Patent: Mar. 13, 2001

(54) SYSTEM FOR INDEPENDENT POWERING OF A COMPUTER SYSTEM

(75) Inventors: Tahir Q. Sheikh, Freemont; Karl S. Johnson, Palo Alto, both of CA (US)

(73) Assignee: Micron Electronics, Inc., Nampa, ID (US)

( * ) Notice: Subject to any disclaimer, the term of this patent is extended or adjusted under 35 U.S.C. 154(b) by 0 days.

(21) Appl. No.: 08/942,410

(22) Filed: Oct. 1, 1997

Related U.S. Application Data

(60) Provisional application No. 60/046,397, filed on May 13, 1997, provisional application No. 60/047,016, filed on May 13, 1997, and provisional application No. 60/046,416, filed on May 13, 1997.

(51) Int. Cl.[7] ........................................... G06F 1/26
(52) U.S. Cl. ............................... 713/310; 709/217
(58) Field of Search .................... 713/300, 310, 713/340, 323, 324; 307/66; 709/217

(56) References Cited

U.S. PATENT DOCUMENTS

| | | | |
|---|---|---|---|
| 4,057,847 | 11/1977 | Lowell et al. | 364/200 |
| 4,100,597 | 7/1978 | Fleming et al. . | |
| 4,449,182 | 5/1984 | Rubinson et al. | 364/200 |
| 4,672,535 | 6/1987 | Katzman et al. | 364/200 |
| 4,692,918 | 9/1987 | Elliott et al. | 370/85 |
| 4,695,946 | 9/1987 | Andreasen et al. | 364/200 |
| 4,707,803 | 11/1987 | Anthony, Jr. et al. . | |
| 4,769,764 | 9/1988 | Levanon | 364/708 |

(List continued on next page.)

FOREIGN PATENT DOCUMENTS

| | | | |
|---|---|---|---|
| 0 866 403 A1 | 9/1998 | (EP) . | |
| 04 333 118 | 11/1992 | (JP) | G06F/1/18 |
| 05 233 110 | 9/1993 | (JP) | G06F/3/00 |
| 07 093 064 | 4/1995 | (JP) | G06F/1/26 |
| 07 261 874 | 10/1995 | (JP) | G06F/1/18 |

OTHER PUBLICATIONS

Haban, D. & D. Wybranietz, *IEEE Transaction on Software Engineering*, 16(2):197–211, Feb. 1990, "A Hybrid Monitor for Behavior and Performance Analysis of Distributed Systems".

ftp.cdrom.com/pub/os2/diskutil/, PHDX software, phdx.zip download, Mar. 1995, "Parallel Hard Disk Xfer".

Cmasters, Usenet post to microsoft.public.windowsnt.setup, Aug. 1997, "Re: FDISK switches".

Hilderbrand, N., Usenet post to comp.msdos.programmer, May 1995, "Re: Structure of disk partition info".

Lewis, L., Usenet post to alt.msdos.batch, Apr. 1997, "Re: Need help with automating FDISK and FORMAT".

Netframe, http://www.netframe–support.com/technology/datasheets/data.htm, before Mar. 1997, "Netframe Cluster-System 9008 Data Sheet".

Simos, M., Usenet post to comp.os.msdos.misc, Apr. 1997, "Re: Auto FDISK and FORMAT".

Wood, H. H., Usenet post to comp.os.netware.misc, Aug. 1996, "Re: Workstation duplication method for WIN95".

Lyons, Computer Reseller News, Issue 721, pp. 61–62, Feb. 3, 1997, "ACC Releases Low–Cost Solution for ISPs".

(List continued on next page.)

*Primary Examiner*—Glenn A. Auve
(74) *Attorney, Agent, or Firm*—Knobbe, Martens, Olson & Bear, LLP

(57) ABSTRACT

A fault tolerant system for independent powering of diagnostic processes through a remote interface by use of a serial (local) or modem (dial-in) gateway. A server connects to a local or remote facility which includes a client computer. If the internal server power is off, the remote interface provides independent external power to portions of the server to facilitate reading of the server internal status or to remotely power up the server from the client computer. The remote interface provides bias power to a chassis microcontroller and a system recorder comprising a non-volatile memory and a microcontroller. The management of the server devices is directed by a network of microcontrollers without intervention of the server operating system software.

24 Claims, 6 Drawing Sheets

U.S. PATENT DOCUMENTS

| | | | |
|---|---|---|---|
| 4,774,502 | 9/1988 | Kimura | 340/501 |
| 4,821,180 | 4/1989 | Gerety et al. | |
| 4,835,737 | 5/1989 | Herrig et al. | |
| 4,894,792 | 1/1990 | Mitchell et al. | |
| 4,949,245 | 8/1990 | Martin et al. | |
| 4,999,787 | 3/1991 | McNally et al. | |
| 5,006,961 | 4/1991 | Monico | |
| 5,007,431 | 4/1991 | Donehoo, III | 128/696 |
| 5,033,048 | 7/1991 | Pierce et al. | 371/21.2 |
| 5,051,720 | 9/1991 | Kittirutsunetorn | 340/310 R |
| 5,073,932 | 12/1991 | Yossifor et al. | 380/23 |
| 5,103,391 | 4/1992 | Barrett | 364/133 |
| 5,118,970 | 6/1992 | Olson et al. | 307/443 |
| 5,121,500 * | 6/1992 | Arlington et al. | 713/300 |
| 5,123,017 | 6/1992 | Simpkins et al. | 371/15.1 |
| 5,136,708 | 8/1992 | Lapourtre et al. | 395/650 |
| 5,136,715 | 8/1992 | Hirose et al. | |
| 5,138,619 | 8/1992 | Fasang et al. | 371/21.1 |
| 5,157,663 | 10/1992 | Major et al. | 371/9.1 |
| 5,210,855 | 5/1993 | Bartol | |
| 5,222,897 | 6/1993 | Collins et al. | 439/157 |
| 5,245,615 | 9/1993 | Treu | 371/16.5 |
| 5,247,683 | 9/1993 | Holmes et al. | 395/700 |
| 5,253,348 | 10/1993 | Scalise | 395/325 |
| 5,261,094 | 11/1993 | Everson et al. | 395/600 |
| 5,265,098 | 11/1993 | Mattson et al. | |
| 5,266,838 * | 11/1993 | Gerner | 307/19 |
| 5,269,011 | 12/1993 | Yanai et al. | |
| 5,272,382 | 12/1993 | Heald et al. | 307/66 |
| 5,272,584 | 12/1993 | Austruy et al. | |
| 5,276,814 | 1/1994 | Bourke et al. | |
| 5,276,863 | 1/1994 | Heider | 395/575 |
| 5,277,615 | 1/1994 | Hastings et al. | 439/377 |
| 5,280,621 | 1/1994 | Barnes et al. | 395/800 |
| 5,283,905 | 2/1994 | Saadeh et al. | 395/750 |
| 5,307,354 | 4/1994 | Cramer et al. | |
| 5,311,397 | 5/1994 | Harshberger et al. | 361/683 |
| 5,311,451 | 5/1994 | Barrett | 364/550 |
| 5,317,693 | 5/1994 | Cuenod et al. | |
| 5,329,625 | 7/1994 | Kannan et al. | |
| 5,337,413 | 8/1994 | Lui et al. | |
| 5,351,276 | 9/1994 | Doll, Jr. et al. | |
| 5,367,670 | 11/1994 | Ward et al. | 395/575 |
| 5,379,184 | 1/1995 | Barraza et al. | 361/685 |
| 5,379,409 | 1/1995 | Ishikawa | 395/575 |
| 5,386,567 | 1/1995 | Lien et al. | |
| 5,388,267 | 2/1995 | Chan et al. | 395/700 |
| 5,402,431 | 3/1995 | Saadeh et al. | 371/67.1 |
| 5,404,494 | 4/1995 | Garney | |
| 5,423,025 | 6/1995 | Goldman et al. | |
| 5,430,717 | 7/1995 | Fowler et al. | 370/58.2 |
| 5,430,845 | 7/1995 | Rimmer et al. | 395/275 |
| 5,432,715 | 7/1995 | Shigematsu et al. | 364/551.01 |
| 5,432,946 | 7/1995 | Allard et al. | 395/750 |
| 5,438,678 * | 8/1995 | Smith | 713/300 |
| 5,440,748 | 8/1995 | Sekine et al. | |
| 5,448,723 | 9/1995 | Rowett | |
| 5,455,933 | 10/1995 | Schieve et al. | 395/183.03 |
| 5,460,441 | 10/1995 | Hastings et al. | 312/298 |
| 5,463,766 | 10/1995 | Schieve et al. | 395/650 |
| 5,465,349 | 11/1995 | Geronimi et al. | |
| 5,471,617 | 11/1995 | Farrand et al. | 395/700 |
| 5,471,634 | 11/1995 | Giorgio et al. | |
| 5,473,499 | 12/1995 | Weir | 361/58 |
| 5,483,419 | 1/1996 | Kaczeus, Sr. et al. | |
| 5,485,550 | 1/1996 | Dalton | 395/51 |
| 5,485,607 | 1/1996 | Lomet et al. | 395/600 |
| 5,487,148 | 1/1996 | Komori et al. | |
| 5,491,791 | 2/1996 | Glowny et al. | |
| 5,493,574 | 2/1996 | McKinley | |
| 5,493,666 | 2/1996 | Fitch | |
| 5,513,314 | 4/1996 | Kandasamy et al. | 395/182.04 |
| 5,513,339 | 4/1996 | Agrawal et al. | |
| 5,515,515 | 5/1996 | Kennedy et al. | |
| 5,517,646 | 5/1996 | Piccirillo et al. | |
| 5,519,851 | 5/1996 | Bender et al. | |
| 5,526,289 | 6/1996 | Dinh et al. | 364/557 |
| 5,528,409 | 6/1996 | Cucci et al. | 359/171 |
| 5,530,810 | 6/1996 | Bowman | |
| 5,533,193 | 7/1996 | Roscoe | |
| 5,535,326 | 7/1996 | Baskey et al. | 395/182.02 |
| 5,542,055 | 7/1996 | Amini et al. | |
| 5,546,272 | 8/1996 | Moss et al. | 361/687 |
| 5,548,712 | 8/1996 | Larson et al. | 395/182.05 |
| 5,555,510 | 9/1996 | Verseput et al. | |
| 5,559,764 | 9/1996 | Chen et al. | 396/30 |
| 5,559,958 | 9/1996 | Farrand et al. | 395/183.03 |
| 5,559,965 | 9/1996 | Oztaskin et al. | |
| 5,560,022 | 9/1996 | Dunstan et al. | |
| 5,564,024 | 10/1996 | Pemberton | |
| 5,566,299 | 10/1996 | Billings et al. | |
| 5,566,339 | 10/1996 | Perholtz et al. | 395/750 |
| 5,568,610 | 10/1996 | Brown | |
| 5,568,619 | 10/1996 | Blackledge et al. | |
| 5,572,403 | 11/1996 | Mills | 361/695 |
| 5,577,205 | 11/1996 | Hwang et al. | |
| 5,579,487 | 11/1996 | Meyerson et al. | 395/280 |
| 5,579,491 | 11/1996 | Jeffries et al. | |
| 5,579,528 * | 11/1996 | Register | 710/129 |
| 5,581,712 | 12/1996 | Herrman | |
| 5,581,714 | 12/1996 | Amini et al. | |
| 5,584,030 | 12/1996 | Husak et al. | 395/750 |
| 5,586,250 | 12/1996 | Carbonneau et al. | |
| 5,588,121 | 12/1996 | Reddin et al. | |
| 5,588,144 | 12/1996 | Inoue et al. | |
| 5,592,611 | 1/1997 | Midgely et al. | |
| 5,596,711 | 1/1997 | Burckhartt et al. | 395/182.21 |
| 5,598,407 | 1/1997 | Bud et al. | 370/330 |
| 5,602,758 | 2/1997 | Lincoln et al. | 364/505 |
| 5,604,873 | 2/1997 | Fite et al. | 395/283 |
| 5,606,672 | 2/1997 | Wade | |
| 5,608,865 | 3/1997 | Midgely et al. | |
| 5,608,876 | 3/1997 | Cohen et al. | |
| 5,615,207 | 3/1997 | Gephardt et al. | |
| 5,621,159 | 4/1997 | Brown et al. | 73/9 |
| 5,621,892 | 4/1997 | Cook | 395/200.1 |
| 5,622,221 | 4/1997 | Genga, Jr. et al. | 165/208 |
| 5,625,238 | 4/1997 | Ady et al. | 307/147 |
| 5,627,962 | 5/1997 | Goodrum et al. | 395/182.11 |
| 5,628,028 | 5/1997 | Michelson | |
| 5,630,076 | 5/1997 | Saulpaugh et al. | 395/284 |
| 5,631,847 | 5/1997 | Kikinis | 364/514 R |
| 5,632,021 | 5/1997 | Jennings et al. | |
| 5,636,341 | 6/1997 | Matsushita et al. | |
| 5,638,289 | 6/1997 | Yamada et al. | |
| 5,644,470 | 7/1997 | Benedict et al. | |
| 5,644,731 | 7/1997 | Liencres et al. | |
| 5,651,006 | 7/1997 | Fujino et al. | |
| 5,652,832 | 7/1997 | Kane et al. | |
| 5,652,833 | 7/1997 | Takizawa et al. | |
| 5,652,839 | 7/1997 | Giorgio et al. | 395/200.11 |
| 5,652,892 | 7/1997 | Ugajin | 395/750 |
| 5,652,908 | 7/1997 | Douglas et al. | 395/800 |
| 5,655,081 | 8/1997 | Bonnell et al. | |
| 5,655,083 | 8/1997 | Bagley | 395/182.31 |
| 5,655,148 | 8/1997 | Richman et al. | |
| 5,659,682 | 8/1997 | Devarakonda et al. | |
| 5,664,118 | 9/1997 | Nishigaki et al. | 395/283 |
| 5,664,119 | 9/1997 | Jeffries et al. | |
| 5,666,538 | 9/1997 | DeNicola | |
| 5,668,943 | 9/1997 | Attanasio et al. | |

| | | | |
|---|---|---|---|
| 5,668,992 | 9/1997 | Hammer et al. ..................... 395/651 |
| 5,669,009 | 9/1997 | Buktenica et al. .............. 395/800.35 |
| 5,671,371 | 9/1997 | Kondo et al. ........................ 395/306 |
| 5,675,723 | 10/1997 | Ekrot et al. . |
| 5,680,288 | 10/1997 | Carey et al. . |
| 5,682,328 | 10/1997 | Roeber et al. . |
| 5,684,671 | 11/1997 | Hobbs et al. . |
| 5,689,637 | 11/1997 | Johnson et al. . |
| 5,696,895 | 12/1997 | Hemphill et al. . |
| 5,696,899 | 12/1997 | Kalwitz . |
| 5,696,949 | 12/1997 | Young ................................... 395/551 |
| 5,696,970 | 12/1997 | Sandage et al. . |
| 5,701,417 | 12/1997 | Lewis et al. . |
| 5,704,031 | 12/1997 | Mikami et al. ................. 395/182.02 |
| 5,708,775 | 1/1998 | Nakamura . |
| 5,708,776 | 1/1998 | Kikinis . |
| 5,712,754 | 1/1998 | Sides et al. ............................ 361/58 |
| 5,715,456 | 2/1998 | Bennett et al. ...................... 395/652 |
| 5,717,570 | 2/1998 | Kikinis ................................. 361/685 |
| 5,721,935 | 2/1998 | DeSchepper et al. . |
| 5,724,529 | 3/1998 | Smith et al. . |
| 5,726,506 | 3/1998 | Wood . |
| 5,727,207 | 3/1998 | Gates et al. .......................... 395/651 |
| 5,732,266 | 3/1998 | Moore et al. ........................ 395/651 |
| 5,737,708 | 4/1998 | Grob et al. ........................... 455/557 |
| 5,737,747 | 4/1998 | Vishlitzky et al. ................... 711/118 |
| 5,740,378 | 4/1998 | Rehl et al. . |
| 5,742,514 | 4/1998 | Bonola ................................. 364/492 |
| 5,742,833 | 4/1998 | Dea et al. ....................... 395/750.05 |
| 5,747,889 | 5/1998 | Raynham et al. . |
| 5,748,426 | 5/1998 | Bedingfield et al. . |
| 5,752,164 | 5/1998 | Jones ................................... 455/33.1 |
| 5,754,396 | 5/1998 | Felcman et al. ..................... 361/683 |
| 5,754,449 | 5/1998 | Hoshal et al. . |
| 5,754,797 | 5/1998 | Takahashi . |
| 5,758,165 | 5/1998 | Shuff ................................... 395/712 |
| 5,758,352 | 5/1998 | Reynolds et al. .................... 707/200 |
| 5,761,033 | 6/1998 | Wilhelm . |
| 5,761,045 | 6/1998 | Olson et al. . |
| 5,761,085 | 6/1998 | Giorgio ................................ 364/505 |
| 5,761,462 | 6/1998 | Neal et al. . |
| 5,761,707 | 6/1998 | Aiken et al. ......................... 711/118 |
| 5,764,924 | 6/1998 | Hong . |
| 5,764,968 | 6/1998 | Ninomiya . |
| 5,765,008 | 6/1998 | Desai et al. . |
| 5,765,198 | 6/1998 | McCrocklin et al. . |
| 5,767,844 | 6/1998 | Stoye ................................... 345/212 |
| 5,768,541 | 6/1998 | Pan-Ratzlaff . |
| 5,768,542 | 6/1998 | Enstrom et al. . |
| 5,771,343 | 6/1998 | Hafner et al. . |
| 5,774,640 | 6/1998 | Kurio . |
| 5,774,645 | 6/1998 | Beaujard et al. . |
| 5,774,741 | 6/1998 | Choi . |
| 5,777,897 | 7/1998 | Giorgio ................................ 364/557 |
| 5,778,197 | 7/1998 | Dunham .............................. 395/284 |
| 5,781,703 | 7/1998 | Desai et al. . |
| 5,781,716 | 7/1998 | Hemphill et al. . |
| 5,781,744 | 7/1998 | Johnson et al. ...................... 395/283 |
| 5,781,767 | 7/1998 | Inoue et al. . |
| 5,781,798 | 7/1998 | Beatty et al. . |
| 5,784,555 | 7/1998 | Stone ................................. 395/200.5 |
| 5,784,576 | 7/1998 | Guthrie et al. . |
| 5,787,019 | 7/1998 | Knight et al. ........................ 364/550 |
| 5,787,459 | 7/1998 | Stallmo et al. ...................... 711/112 |
| 5,787,491 | 7/1998 | Merkin et al. ....................... 711/173 |
| 5,790,775 | 8/1998 | Marks et al. .................... 395/182.07 |
| 5,790,831 | 8/1998 | Lin et al. . |
| 5,793,948 | 8/1998 | Asahi et al. . |
| 5,793,987 | 8/1998 | Quackenbush et al. . |
| 5,794,035 | 8/1998 | Golub et al. . |
| 5,796,185 | 8/1998 | Takata et al. . |
| 5,796,580 | 8/1998 | Komatsu et al. .................... 361/687 |
| 5,796,934 | 8/1998 | Bhanot et al. . |
| 5,796,981 | 8/1998 | Abudayyeh et al. . |
| 5,797,023 | 8/1998 | Berman et al. ................. 395/750.06 |
| 5,798,828 | 8/1998 | Thomas et al. . |
| 5,799,036 | 8/1998 | Staples . |
| 5,799,196 | 8/1998 | Flannery ........................ 395/750.03 |
| 5,801,921 | 9/1998 | Miller . |
| 5,802,269 | 9/1998 | Poisner et al. . |
| 5,802,298 | 9/1998 | Imai et al. ....................... 395/200.47 |
| 5,802,305 | 9/1998 | McKaughan et al. .......... 395/200.57 |
| 5,802,324 | 9/1998 | Wunderlich et al. ................ 395/281 |
| 5,802,393 | 9/1998 | Begun et al. . |
| 5,802,552 | 9/1998 | Fandrich et al. . |
| 5,802,592 | 9/1998 | Chess et al. ......................... 711/164 |
| 5,803,357 | 9/1998 | Lakin .................................. 236/78 B |
| 5,805,804 | 9/1998 | Laursen et al. . |
| 5,805,834 | 9/1998 | McKinley et al. . |
| 5,809,224 | 9/1998 | Schultz et al. . |
| 5,809,256 | 9/1998 | Najemy . |
| 5,809,287 | 9/1998 | Stupek, Jr. et al. ................. 395/500 |
| 5,809,311 | 9/1998 | Jones ............................. 395/750.01 |
| 5,809,555 | 9/1998 | Hobson ............................... 711/172 |
| 5,812,748 | 9/1998 | Ohran et al. .................... 395/182.02 |
| 5,812,750 | 9/1998 | Dev et al. . |
| 5,812,757 | 9/1998 | Okamoto et al. . |
| 5,812,858 | 9/1998 | Nookala et al. . |
| 5,815,117 | 9/1998 | Kolanek . |
| 5,815,647 | 9/1998 | Buckland et al. .............. 395/182.01 |
| 5,815,651 | 9/1998 | Litt . |
| 5,815,652 | 9/1998 | Ote et al. . |
| 5,821,596 | 10/1998 | Miu et al. ............................ 257/419 |
| 5,822,547 | 10/1998 | Boesch et al. . |
| 5,826,043 | * 10/1998 | Smith et al. ......................... 710/101 |
| 5,829,046 | 10/1998 | Tzelnic et al. ....................... 711/162 |
| 5,835,719 | 11/1998 | Gibson et al. .................. 395/200.51 |
| 5,835,738 | 11/1998 | Blackledge, Jr. et al. . |
| 5,838,932 | 11/1998 | Alzien ................................. 395/308 |
| 5,841,964 | 11/1998 | Yamaguchi . |
| 5,841,991 | 11/1998 | Russell . |
| 5,845,061 | 12/1998 | Miyamoto et al. . |
| 5,845,095 | 12/1998 | Reed et al. . |
| 5,850,546 | 12/1998 | Kim . |
| 5,852,720 | 12/1998 | Gready et al. . |
| 5,852,724 | 12/1998 | Glenn, II et al. . |
| 5,857,074 | 1/1999 | Johnson . |
| 5,857,102 | 1/1999 | McChesney et al. ................ 395/653 |
| 5,864,653 | 1/1999 | Tavallaei et al. .................... 315/181 |
| 5,864,654 | 1/1999 | Marchant . |
| 5,864,713 | 1/1999 | Terry . |
| 5,867,730 | 2/1999 | Leyda .................................. 395/830 |
| 5,875,307 | 2/1999 | Ma et al. ............................. 395/281 |
| 5,875,308 | 2/1999 | Egan et al. . |
| 5,875,310 | 2/1999 | Buckland et al. ................... 395/306 |
| 5,878,237 | 3/1999 | Olarig ................................. 395/308 |
| 5,878,238 | 3/1999 | Gan et al. ............................ 395/308 |
| 5,881,311 | 3/1999 | Woods ................................. 395/824 |
| 5,884,027 | 3/1999 | Garbus et al. ..................... 395/200.8 |
| 5,884,049 | * 3/1999 | Atkinson ............................. 710/101 |
| 5,886,424 | * 3/1999 | Kim ..................................... 710/100 |
| 5,889,965 | 3/1999 | Wallach et al. ...................... 395/283 |
| 5,892,898 | 4/1999 | Fujii et al. . |
| 5,892,915 | 4/1999 | Duso et al. . |
| 5,892,928 | 4/1999 | Wallach et al. ...................... 395/283 |
| 5,893,140 | 4/1999 | Vahalia et al. ....................... 711/118 |
| 5,898,846 | 4/1999 | Kelly . |
| 5,898,888 | 4/1999 | Guthrie et al. ....................... 395/308 |
| 5,905,867 | 5/1999 | Giorgio .......................... 395/200.54 |
| 5,907,672 | 5/1999 | Matze et al. .................... 395/182.06 |
| 5,909,568 | 6/1999 | Nason . |
| 5,911,779 | 6/1999 | Stallmo et al. ........................... 714/6 |

| | | |
|---|---|---|
| 5,913,034 | 6/1999 | Malcolm .......................... 395/200.53 |
| 5,922,060 | 7/1999 | Goodrum ............................ 710/103 |
| 5,930,358 | 7/1999 | Rao . |
| 5,935,262 | 8/1999 | Barrett et al. .......................... 714/46 |
| 5,936,960 | 8/1999 | Stewart ................................ 370/438 |
| 5,938,751 | 8/1999 | Tavallaei et al. .................... 710/103 |
| 5,941,996 | 8/1999 | Smith et al. ........................... 714/47 |
| 5,964,855 | 10/1999 | Bass et al. ............................ 710/103 |
| 5,983,349 | 11/1999 | Kodama et al. ..................... 713/200 |
| 5,987,554 | 11/1999 | Liu et al. .............................. 710/129 |
| 5,987,621 | 11/1999 | Duso et al. ............................... 714/4 |
| 5,987,627 | 11/1999 | Rawlings, III ........................ 714/48 |
| 6,012,130 | 1/2000 | Beyda et al. ......................... 711/173 |
| 6,038,624 | 3/2000 | Chan et al. .......................... 710/103 |

OTHER PUBLICATIONS

M2 Communications, M2 Presswire, 2 pages, Dec. 19, 1996, "Novell IntranetWare Supports Hot Pluggable PCI from NetFRAME".

Rigney, PC Magazine, 14(17): 375–379, Oct. 10, 1995, "The One for the Road (Mobile–aware capabilities in Windows 95)".

Shanley, and Anderson, PCI System Architecture, Third Edition, p. 382, Copyright 1995.

Gorlick, M., Conf. Proceedings: ACM/ONR Workshop on Parallel and Distributed Debugging, pp. 175–181, 1991, "The Flight Recorder: An Architectural Aid for System Monitoring".

IBM Technical Disclosure Bulliten, 92A=62947, pp. 391–394, Oct. 1992, Method for Card Hot Plug Detection and Control.

Davis, T, Usenet post to alt.msdos.programmer, Apr. 1997, "Re: How do I create an FDISK batch file?".

Davis, T., Usenet post to alt.msdos.batch, Apr. 1997, "Re: Need help with automating FDISK and FORMAT . . . ".

NetFRAME Systems Incorporated, Doc. No. 78–1000226–01, pp. 1–2, 5–8, 359–404, and 471–512, Apr. 1996, "NetFRAME Clustered Multiprocessing Software: NW0496 DC–ROM for Novell® NetWare® 4.1 SMP, 4.1, and 3.12.".

Shanley, and Anderson, PCI System Architecture, Third Edition, Chapter 15, pp. 297–302, Copyright 1995, "Intro To Configuration Address Space."

Shanley, and Anderson, PCI System Architecture, Third Edition, Chapter 16, pp. 303–328, Copyright 1995, "Configuration Transactions."

Sun Microsystems Computer Company, Part No. 802–5355–10, Rev. A, May 1996, "Solstice SyMON User's Guid.".

Sun Microsystems, Part No. 802–6569–11, Release 1.0.1, Nov. 1996, "Remotes Systems Diagnostics Installation & User Guide.".

Shanley and Anderson, PCI System Architecture, Third Edition, Chapters 15 & 16, pp. 297–328, CR 1995.

PCI Hot–Plug Specification, Preliminary Revision for Review Only, Revision 0.9, pp. i–iv, and 1–25, Mar. 5, 1997.

SES SCSI–3 Enclosure Services, X3T10/Project 1212–D/ Rev 8a, pp. i, iii–x, 1–76, and I–1 (index), Jan. 16, 1997.

Compaq Computer Corporation, Technology Brief, pp. 1–13, Dec. 1996, "Where Do I Plug the Cable? Solving the Logical–Physical Slot Numbering Problem."

NetFRAME Systems Incorporated,*News Release*, 3 pages, referring to May, 9, 1994, "NetFRAME's New High–Availability ClusterServer Systems Avoid Scheduled as well as Unscheduled Downtime."

Herr, et al., Linear Technology Magazine, *Design Features*, pp. 21–23, Jun. 1997, "Hot Swapping the PCI Bus."

Lockareff, M., HTINews,, http://www.hometoys.com/htinews/dec96/articles/Ionworks.htm,Dec. 1996, "Lonworks—An Introduction".

NetFRAME Systems Incorporated, datasheet, Feb. 1992, "NF450FT Network Mainframe".

NetFRAME Systems Incorporated, datasheet, Mar. 1996, "NetFRAME Cluster Server 8000".

Schofield, M.J., http://www.omegas.co.uk/CAN/canworks.htm, Copyright 1996, 1997, "Controller Area Network—How CAN Works".

Http://www.nrtt.demon.co.uk/cantech.html, May 28, 1997, "CAN: Technical overview".

* cited by examiner

SYSTEM FOR INDEPENDENT POWERING OF A COMPUTER SYSTEM

RELATED APPLICATIONS

The subject matter of U.S. Patent Application entitled "Method of Independent Powering of Diagnostic Processes on a Computer System," filed on Oct. 1, 1997, application Ser. No. 08/942,320, and having attorney Docket No. MNFRAME.002A4 is related to this application.

COPYRIGHT RIGHTS

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

INCORPORATION BY REFERENCE OF COMMONLY OWNED APPLICATIONS

The following U.S. pat. application, commonly owned and filed Oct. 1, 1997, are hereby incorporated herein in their entirety be reference thereto:

| Title | U.S. patent application Ser. No. | Status |
| --- | --- | --- |
| "System Architecture for Remote Access and Control of Environmental Management" | 08/942,160 | PENDING |
| "Method of Remote Access and Control of Environmental Management" | 08/942,215 | PENDING |
| "System for Independent Powering of Diagnostic Processes on a Computer System" | 08/942,410 | PENDING |
| "Diagnostic and Managing Distributed Processor System" | 08/942,402 | PENDING |
| "Method for Managing a Distributed Processor System" | 08/942,448 | PENDING |
| "System for Mapping Environmental Resources to Memory for Program Access" | 08/942,222 | PENDING |
| "Method for Mapping Environmental Resources to Memory for Program Access" | 08/942,214 | PENDING |
| "Hot Add of Devices Software Architecture" | 08/942,309 | PENDING |
| "Method for The Hot Add of Devices" | 08/942,306 | PENDING |
| "Hot Swap of Devices Software Architecture" | 08/942,311 | PENDING |
| "Method for The Hot Swap of Devices" | 08/942,457 | PENDING |
| "Method for the Hot Add of a Network Adapter on a System Including a Dynamically Loaded Adapter Driver" | 08/943,072 | ISSUED 4/6/99 (U.S. Pat. No. 5,892,928) |
| "Method for the Hot Add of a Mass Storage Adapter on a System Including a Statically Loaded Adapter Driver" | 08/942,069 | PENDING |
| "Method for the Hot Add of a Network Adapter on a System Including a Statically Loaded Adapter Driver" | 08/942,465 | PENDING |
| "Method for the Hot Add of a Mass Storage Adapter on a System Including a Dynamically Loaded Adapter Driver" | 08/962,963 | PENDING |
| "Method for the Hot Swap of a Network Adapter on a System Including a Dynamically Loaded Adapter Driver" | 08/943,078 | ISSUED 3/30/99 (U.S. Pat. No. 5,889,965) |
| "Method for the Hot Swap of a Mass Storage Adapter on a System Including a Statically Loaded Adapter Driver" | 08/942,336 | PENDING |
| "Method for the Hot Swap of a Network Adapter on a System Including a Statically Loaded Adapter Driver" | 08/942,459 | PENDING |
| "Method for the Hot Swap of a Mass Storage Adapter on a System Including a Dynamically Loaded Adapter Driver" | 08/942,458 | PENDING |
| "Method of Performing an Extensive Diagnostic Test in Conjunction with a BIOS Test Routine" | 08/942,463 | ISSUED 3/07/00 (U.S. Pat. No. 6,035,420) |
| "Apparatus for Performing an Extensive Diagnostic Test in Conjunction with a BIOS Test Routine" | 08/942,163 | ISSUED 12/28/99 (U.S. Pat. No. 6,009,541) |
| "Configuration Management Method for Hot Adding and Hot Replacing Devices" | 08/941,268 | PENDING |
| "Configuration Management System for Hot Adding and Hot Replacing Devices" | 08/942,408 | PENDING |
| "Apparatus for Interfacing Buses" | 08/942,382 | PENDING |
| "Method for Interfacing Buses" | 08/942,413 | ISSUED 11/16/99 (U.S. Pat. No. 5,987,554) |
| "Computer Fan Speed Control Device" | 08/942,447 | ISSUED 11/23/99 (U.S. Pat. No. 5,990,582) |
| "Computer Fan Speed Control Method" | 08/942,216 | ISSUED 10/05/99 (U.S. Pat. No. 5,962,933) |
| "System for Powering Up and Powering Down a Server" | 08/943,076 | PENDING |
| "Method of Powering Up and Powering Down a Server" | 08/943,077 | PENDING |
| "System for Resetting a Server" | 08/942,333 | ISSUED 5/16/00 (U.S. Pat. No. 6,065,053) |
| "Method of Resetting a Server" | 08/942,405 | PENDING |
| "System for Displaying Flight Recorder" | 08/942,070 | PENDING |
| "Method of Displaying Flight Recorder" | 08/942,068 | PENDING |
| "Synchronous Communication Interface" | 08/943,355 | PENDING |
| "Synchronous Communication Emulation" | 08/942,004 | ISSUED 5/30/00 (U.S. Pat. No. 6,068,661) |
| "Software System Facilitating the Replacement or Insertion of Devices in a Computer System" | 08/942,317 | PENDING |
| "Method for Facilitating the Replacement or Insertion of Devices in a Computer System" | 08/942,316 | PENDING |
| "System Management Graphical User Interface" | 08/943,357 | PENDING |
| "Display of System Information" | 08/942,195 | ISSUED 4/4/00 (U.S. Pat. No. 6,046,742) |
| "Data Management System | 08/942,129 | PENDING |

-continued

| Title | U.S. patent application Ser. No. | Status |
|---|---|---|
| Supporting Hot Plug Operations on a Computer" | | |
| "Data Management Method Supporting Hot Plug Operations on a Computer" | 08/942,124 | ISSUED 5/2/00 (U.S. Pat. No. 6,058,445) |
| "Alert Configurator and Manager" | 08/942,005 | PENDING |
| "Managing Computer System Alerts" | 08/943,356 | PENDING |
| "Computer Fan Speed Control System" | 08/940,301 | PENDING |
| "Computer Fan Speed Control System Method" | 08/941,267 | PENDING |
| "Black Box Recorder for Information System Events" | 08/942,381 | PENDING |
| "Method of Recording Information System Events" | 08/942,164 | PENDING |
| "Method for Automatically Reporting a System Failure in a Server" | 08/942,168 | PENDING |
| "System for Automatically Reporting a System Failure in a Server" | 08/942,384 | PENDING |
| "Expansion of PCI Bus Loading Capacity" | 08/942,404 | PENDING |
| "Method for Expanding PCI Bus Loading Capacity" | 08/942,223 | PENDING |
| "System for Displaying System Status" | 08/942,347 | PENDING |
| "Method of Displaying System Status" | 08/942,071 | PENDING |
| "Fault Tolerant Computer System" | 08/942,194 | PENDING |
| "Method for Hot Swapping of Network Components" | 08/943,044 | PENDING |
| "A Method for Communicating a Software Generated Pulse Waveform Between Two Servers in a Network" | 08/942,221 | PENDING |
| "A System for Communicating a Software Generated Pulse Waveform Between Two Servers in a Network" | 08/942,409 | PENDING |
| "Method for Clustering Software Applications" | 08/942,318 | PENDING |
| "System for Clustering Software Applications" | 08/942,411 | PENDING |
| "Method for Automatically Configuring a Server after Hot Add of a Device" | 08/942,319 | PENDING |
| "System for Automatically Configuring a Server after Hot Add of a Device" | 08/942,331 | PENDING |
| "Method of Automatically Configuring and Formatting a Computer System and Installing Software" | 08/942,412 | PENDING |
| "System for Automatically Configuring and Formatting a Computer System and Installing Software" | 08/941,955 | PENDING |
| "Determining Slot Numbers in a Computer" | 08/942,462 | PENDING |
| "System for Detecting Errors in a Network" | 08/942,169 | PENDING |
| "Method of Detecting Errors in a Network" | 08/940,302 | PENDING |
| "System for Detecting Network Errors" | 08/942,407 | PENDING |
| "Method of Detecting Network Errors" | 08/942,573 | PENDING |

BACKGROUND OF THE INVENTION

1. Field of the Invention

The invention relates to fault tolerant computer systems. More specifically, the invention is directed to a system for providing remote access and control of server environmental management.

2. Description of the Related Technology

As enterprise-class servers become more powerful and more capable, they are also becoming increasingly sophisticated and complex. For many companies, these changes lead to concerns over server reliability and manageability, particularly in light of the increasingly critical role of server-based applications. While in the past many systems administrators were comfortable with all of the various components that made up a standards-based network server, today's generation of servers can appear as an incomprehensible, unmanageable black box. Without visibility into the underlying behavior of the system, the administrator must "fly blind." Too often the only indicators the network manager has on the relative health of a particular server is whether or not it is running.

It is well-acknowledged that there is a lack of reliability and availability of most standards-based servers. Server downtime, resulting either from hardware or software faults or from regular maintenance, continues to be a significant problem. By one estimate, the cost of downtime in mission critical environments has risen to an annual total of $4.0 billion for U.S. businesses, with the average downtime event resulting in a $140 thousand loss in the retail industry and a $450 thousand loss in the securities industry. It has been reported that companies lose as much as $250 thousand in employee productivity for every 1% of computer downtime. With emerging Internet, intranet and collaborative applications taking on more essential business roles every day, the cost of network server downtime will continue to spiral upward.

While hardware fault tolerance is an important element of an overall high availability architecture, it is only one piece of the puzzle. Studies show that a significant percentage of network server downtime is caused by transient faults in the I/O subsystem. These faults may be due, for example, to the device driver, the adapter card firmware, or hardware which does not properly handle concurrent errors, and often causes servers to crash or hang. The result is hours of downtime per failure, while a system administrator discovers the failure takes some action, and manually reboots the server. In many cases, data volumes on hard disk drives become corrupt and must be repaired when the volume is mounted. A dismount-and-mount cycle may result from the lack of "hot pluggability" in current standards-based servers. Diagnosing intermittent errors can be a frustrating and time-consuming process. For a system to deliver consistently high availability, it must be resilient to these types of faults. Accurate and available information about such faults is central to diagnosing the underlying problems and taking corrective action.

Modern fault tolerant systems have the functionality to provide the ambient temperature of a storage device enclosure and the operational status of other components such as the cooling fans and power supply. However, a limitation of these server systems is that they do not contain self-managing processes to correct malfunctions. Also, if a malfunction occurs in a typical server, it relies on the operating system software to report, record and manage recovery of the fault. However, many types of faults will prevent such software from carrying out these tasks. For example, a disk drive failure can prevent recording of the fault in a log file on that disk drive. If the system error caused the system to power down, then the system administrator would never know the source of the error.

Traditional systems are lacking in detail and sophistication when notifing system administrators of system malfunctions. System administrators are in need of a graphical user interface for monitoring the health of a network of servers. Administrators need a simple point-and-click interface to evaluate the health of each server in the network. In addition, existing fault tolerant servers rely upon operating system maintained logs for error recording. These systems are not capable of maintaining information when the operating system is inoperable due to a system malfunction. Existing systems do not have a system log for maintaining information when the main computational processors are inoperable or the operating system has crashed.

Another limitation of the typical fault tolerant system is that the control logic for the diagnostic system is associated with a particular processor. Thus, if the environmental control processor malfunctioned, then all diagnostic activity on the computer would cease. In traditional systems, if a controller dedicated to the fan system failed, then all fan activity could cease resulting in overheating and ultimate failure of the server. What is desired is a way to obtain diagnostic information when the server OS is not operational or even when main power to the server is down.

Existing fault tolerant systems also lack the power to remotely control a particular server, such as powering up and down, resetting, reading system status, displaying flight recorder and so forth. Such control of the server is desired even when the server power is down. For example, if the operating system on the remote machine failed, then a system administrator would have to physically go to the remote machine to re-boot the malfunctioning machine before any system information could be obtained or diagnostics could be started.

Therefore, a need exists for improvements in server management which will result in greater reliability and dependability of operation. Server users are in need of a management system by which the users can accurately gauge the health of their system. Users need a high availability system that must not only be resilient to faults, but must allow for maintenance, modification, and growth—without downtime. System users must be able to replace failed components, and add new functionality, such as new network interfaces, disk interface cards and storage, without impacting existing users. As system demands grow, organizations must frequently expand, or scale, their computing infrastructure, adding new processing power, memory, storage and I/O capacity. With demand for 24-hour access to critical, server-based information resources, planned system downtime for system service or expansion has become unacceptable.

SUMMARY OF THE INVENTION

The inventive remote access system provides system administrators with new levels of client/server system availability and management. It gives system administrators and network managers a comprehensive view into the underlying health of the server—in real time, whether on-site or off-site. In the event of a failure, the invention enables the administrator to learn why the system failed, why the system was unable to boot, and to control certain functions of the server from a remote station.

One embodiment of the present invention is a system for independent powering of a first computer, comprising a first computer storing status information; a first computer power supply that supplies power to the first computer; a remote interface power supply that is independent from the first computer power supply; and a remote interface circuit that receives power from the remote interface power supply and is capable of providing independent power to portions of the first computer to facilitate reading of the status information.

Another embodiment of the present invention is a system for independent powering of a first computer, comprising a first computer storing status information; a first computer power supply that supplies power to the first computer; a remote interface power supply; and a remote interface circuit that receives power from the remote interface power supply and is capable of providing power to at least a portion of the first computer.

Yet another embodiment of the present invention is a system for independent powering of a power-on process on a computer comprising a first computer having a first computer power supply; and a remote interface circuit that receives power from a power supply that is independent from the first computer power supply and provides independent power to portions of the first computer to facilitate remotely powering up the first computer if the first computer power supply is operating below a predetermined threshold.

DETAILED DESCRIPTION OF THE INVENTION

The following detailed description presents a description of certain specific embodiments of the present invention. However, the present invention can be embodied in a multitude of different ways as defined and covered by the claims. In this description, reference is made to the drawings wherein like parts are designated with like numerals throughout.

For convenience, the description will be organized into the following principal sections: Introduction, Server System, Microcontroller Network, Remote Interface Board, Remote Interface Serial Protocol, Microcontroller Network Bias Power.

I. INTRODUCTION

The inventive computer server system and client computer includes a distributed hardware environment management system that is built as a small self-contained network of microcontrollers. Operating independently of the system processor and operating software, embodiments of the present invention use separate processors for providing information and managing the hardware environment including fans, power supplies and temperature.

Initialization, modification and retrieval of system conditions are performed through utilization of a remote interface by issuing commands to the environmental processors. The system conditions may include system log size, presence of faults in the system log, serial number for each of the environmental processors, serial numbers for each power supply of the system, system identification, system log count, power settings and presence, canister presence, temperature, BUS/CORE speed ratio, fan speeds, settings for fan faults, LCD display, Non-Maskable Interrupt (NMI) request bits, CPU fault summary, FRU status, JTAG enable bit, system log information, remote access password, over-temperature fault, CPU error bits, CPU presence, CPU thermal fault bits, and remote port modem. The aforementioned list of capabilities provided by the present environmental system is not all-inclusive.

The server system and client computer provides mechanisms for the evaluation of the data that the system collects and methods for the diagnosis and repair of server problems in a manner that system errors can be effectively and efficiently managed. The time to evaluate and repair problems is minimized. The server system ensures that the system will not go down, so long as sufficient system resources are available to continue operation, but rather degrade gracefully until the faulty components can be replaced.

II. SERVER SYSTEM

Figure 1:
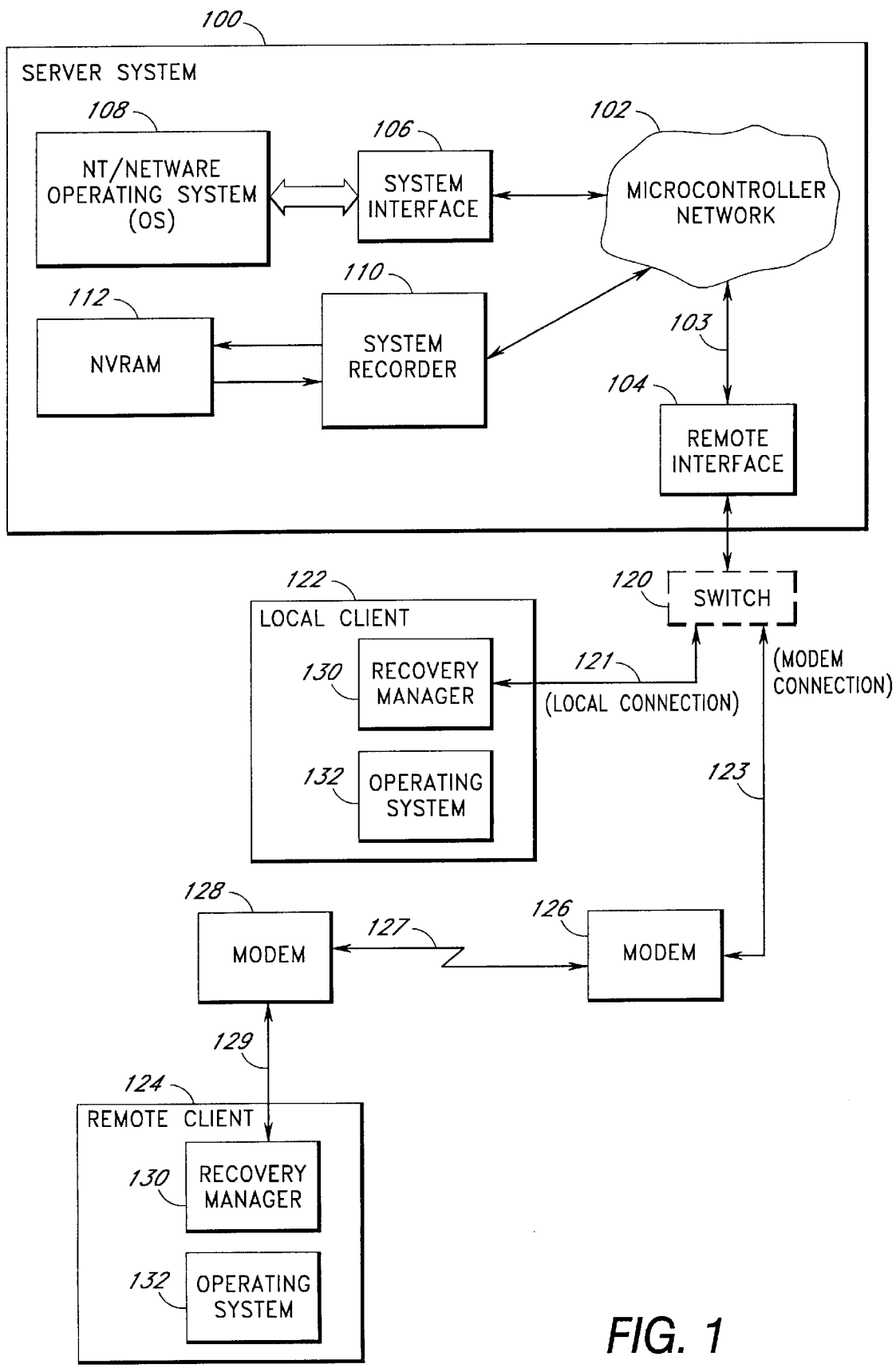
FIG. 1 is a top level block diagram of microcontroller network components utilized by an embodiment of the present invention.

Referring to FIG. 1, a server system 100 with a remote client computer will be described. In one embodiment, the server system hardware environment 100 may be built around a self-contained network of microcontrollers, such as, for example, a remote interface microcontroller on the remote interface board or circuit 104, a system interface microcontroller 106 and a system recorder microcontroller 110. This distributed service processor network 102 may operate as a fully self-contained subsystem within the server system 100, continuously monitoring and managing the physical environment of the machine (e.g., temperature, voltages, fan status). The microcontroller network 102 continues to operate and provides a system administrator with critical system information, regardless of the operational status of the server 100.

Information collected and analyzed by the microcontroller network 102 can be presented to a system administrator using either SNMP-based system management software (not shown), or using microcontroller network Recovery Manager software 130 through a local connection 121 or a dial-in connection 123. The system management software, which interfaces with the operating software (OS) 108 such as Microsoft Windows NT Version 4.0 or Novell Netware Version 4.11, for example, provides the ability to manage the specific characteristics of the server system, including Hot Plug Peripheral Component Interconnect (PCI), power and cooling status, as well as the ability to handle alerts associated with these features.

The microcontroller network Recovery Manager software 130 allows the system administrator to query the status of the server system 100 through the microcontroller network 102, even when the server is down. Using the microcontroller network remote management capability, a system administrator can use the Recovery Manager 130 to re-start a failed system through a modem connection 123. First, the administrator can remotely view the microcontroller network Flight Recorder, a feature that stores all system messages, status and error reports in a circular Non-Volatile Random Access Memory buffer (NVRAM) 112. Then, after determining the cause of the system problem, the administrator can use microcontroller network "fly by wire" capability to reset the system, as well as to power the system off or on. "Fly by wire" denotes that no switch, indicator or other control is directly connected to the function it monitors or controls, but instead, all the control and monitoring connections are made by the microcontroller network 102.

The remote interface board (RIB) 104 interfaces the server system 100 to an external client computer. The RIB 104 connects to either a local client computer 122 at the same location as the server 100 or to remote (or link) client computer 124 through an optional switch 120. The client computer 122/124 may in one embodiment run either Microsoft Windows 95 or Windows NT Workstation version 4.0 operating software (OS) 132. The processor and RAM requirements of the client computer 122/124 are such as necessary by the OS 132. The serial port of the client computer 122/124 may utilize a type 16550A Universal Asynchronous Receiver Transmitter (UART). The switch facilitates either the local connection 121 or the modem connection 123 at any one time, but allows both types of connections to be connected to the switch. In an another embodiment, either the local connection 121 or the modem connection 123 is connected directly to the RIB 104. The local connection 121 utilizes a readily available null-modem serial cable to connect to the local client computer. The modem connection may utilize a Hayes-compatible server modem 126 and a Hayes-compatible client modem 128. In one embodiment, a model V.34X 33.6K data/fax modem available from Zoom is utilized as the client modem and the server modem. In another embodiment, a Sportster 33.6K data/fax modem available from US Robotics is utilized as the client modem.

The steps of connecting the remote client computer 124 to the server 100 will now be briefly described. The remote interface 104 has a serial port connector 204 (FIG. 3) that directly connects with a counterpart serial port connector of the external server modem 126 without the use of a cable. If desired, a serial cable could be used to interconnect the remote interface 104 and the server modem 126. The cable end of an AC to DC power adapter (not shown, for example a 120 Volt AC to 7.5 Volt DC, or a 220V, European or Japanese adapter) is then connected to the DC power connector J2 (220, FIG. 3) of the remote interface, while the double-prong end is plugged into a 120 Volt AC wall outlet. One end of an RJ-45 parallel-wire data cable 103 is then plugged into an RJ-45 jack (226, FIG. 3) on the remote interface 104, while the other end is plugged into a RJ-45 Recovery Manager jack on the server 100. The RJ-45 jack on the server then connects to the microcontroller network 102. The server modem 126 is then connected to a communications network 127 using an appropriate connector. The communications network 127 may be a public switched telephone network, although other modem types and communication networks are envisioned. For example, if cable modems are used for the server modem 126 and client modem 128, the communications network can be a cable television network. As another example, satellite modulator/demodulators can be used in conjunction with a satellite network.

At the remote client computer 124, a serial cable (25-pin D-shell) 129 is used to interconnect the client modem 128 and the client computer 124. The client modem 128 is then connected to the communications network 127 using an appropriate connector. Each modem is then plugged into an appropriate power source for the modem, such as an AC outlet. At this time, the Recovery Manager software 130 is loaded into the client computer 124, if not already present, and activated.

The steps of connecting the local client computer 122 to the server 100 are similar, but modems are not necessary. The main difference is that the serial port connector of the remote interface 104 connects to a serial port of the local client computer 122 by the null-modem serial cable 121.

III. MICROCONTROLLER NETWORK

In one embodiment, the invention is implemented by a network of microcontrollers 102 (FIG. 1). The microcontrollers may provide functionality for system control, diagnostic routines, self-maintenance control, and event logging processors. A further description of the microcontrollers and microcontroller network is provided in U.S. patent application Ser. No. 08/942,402, entitled "Diagnostic and Managing Distributed Processor System", and in U.S. patent application Ser. No. 08/942,160, entitled "System Architecture For Remote Access and Control of Environmental Management".

Figure 2:
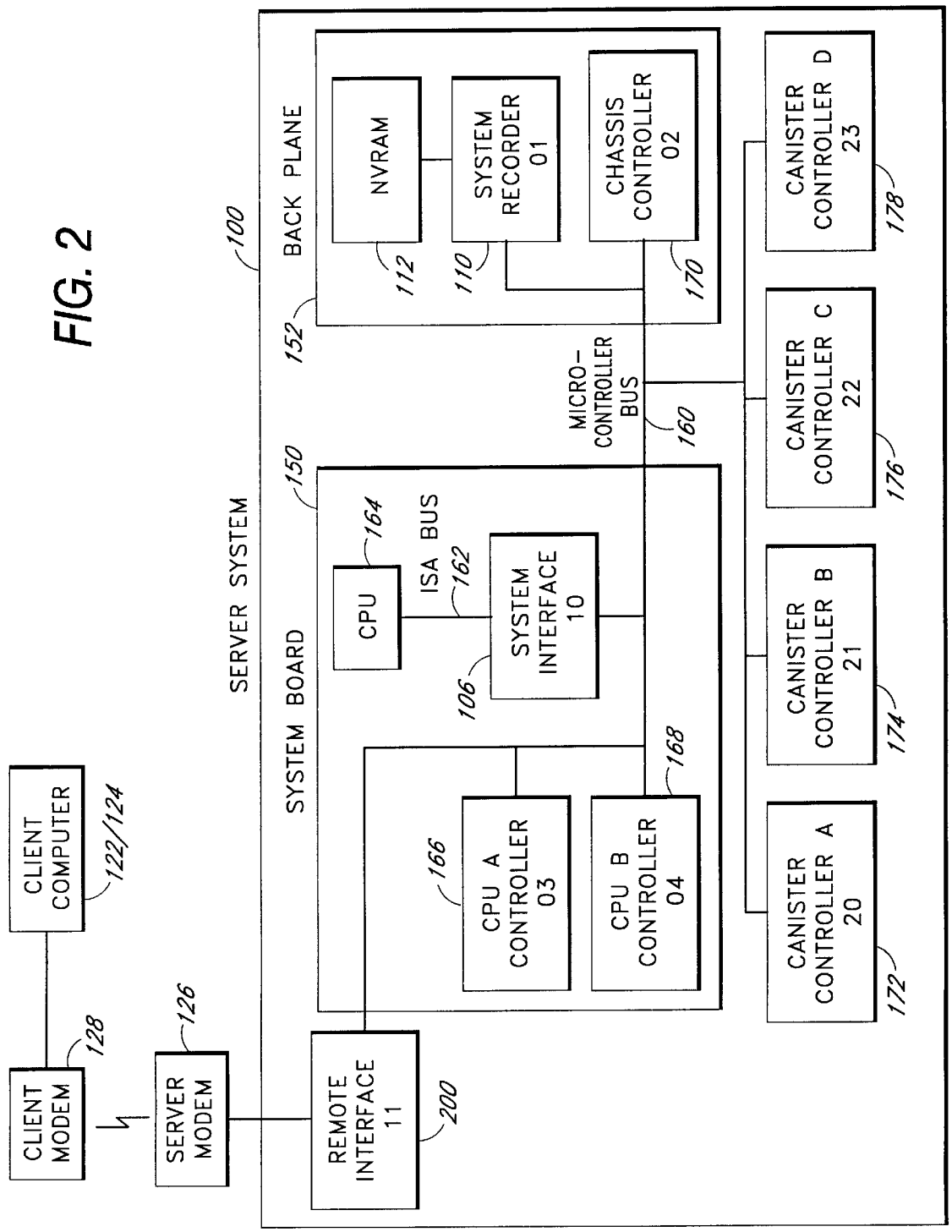
FIG. 2 is a block diagram of the server portion of the microcontroller network shown in FIG. 1.

Referring to FIG. 2, in one embodiment of the invention, the network of microcontrollers 102 includes ten processors. One of the purposes of the microcontroller network 102 is to transfer messages to the other components of the server system 100. The processors may include: a System Interface controller 106, a CPU A controller 166, a CPU B controller 168, a System Recorder 110, a Chassis controller 170, a Canister A controller 172, a Canister B controller 174, a Canister C controller 176, a Canister D controller 178 and a Remote Interface controller 200. The Remote Interface controller 200 is located on the RIB 104 (FIG. 1) which is part of the server system 100, but may preferably be external to a server enclosure. The System Interface controller 106, the CPU A controller 166 and the CPU B controller 168 are located on a system board 150 in the server 100. Also located on the system board are one or more central processing units (CPUs) or microprocessors 164 and an Industry Standard Architecture (ISA) bus 162 that connects to the System Interface Controller 106. Of course, other buses such as PCI, EISA and microchannel may be used. The CPU 164 may be any conventional general purpose single-chip or multi-chip microprocessor such as a Pentium®, Pentium® Pro or Pentium® II processor available from Intel Corporation, a SPARC processor available from Sun Microsystems, a MIPS® processor available from Silicon Graphics, Inc., a Power PC® processor available from Motorola, or an ALPHA® processor available from Digital Equipment Corporation. In addition, the CPU 164 may be any conventional special purpose microprocessor such as a digital signal processor or a graphics processor.

The System Recorder 110 and Chassis controller 170, along with the NVRAM 112 that connects to the System Recorder 110, may be located on a backplane 152 of the server 100. The System Recorder 110 and Chassis controller 170 are typically the first microcontrollers to power up when server power is applied. The System Recorder 110, the Chassis controller 170 and the Remote Interface microcontroller 200 are the three microcontrollers that have a bias 5 volt power supplied to them. If the main server power is off, an independent power supply source for the bias 5 volt power is provided by the RIB 104 (FIG. 1). The Canister controllers 172–178 are not considered to be part of the backplane 152 because they are located on separate cards and are removable.

Each of the microcontrollers has a unique system identifier or address. The addresses are as follows in Table 1:

TABLE 1

| Microcontroller | Address |
|---|---|
| System Interface controller 106 | 10 |
| CPU A controller 166 | 03 |
| CPU B controller 168 | 04 |
| System Recorder 110 | 01 |
| Chassis controller 170 | 02 |
| Canister A controller 172 | 20 |
| Canister B controller 174 | 21 |
| Canister C controller 176 | 22 |
| Canister D controller 178 | 23 |
| Remote Interface controller 200 | 11 |

The microcontrollers may be Microchip Technologies, Inc. PIC processors in one embodiment, although other microcontrollers such as an 8051 available from Intel, an 8751 available from Atmel, and a P80CL580 microprocessor available from Philips, could be utilized. The PIC16C74 (Chassis controller 170) and PIC16C65 (the other controllers) are members of the PIC16CXX family of CMOS, fully-static, EPROM-based 8-bit microcontrollers. The PIC controllers have 192 bytes of RAM, in addition to program memory, three timer/counters, two capture/compare/Pulse Width Modulation modules and two serial ports. The synchronous serial port is configured as a two-wire Inter-Integrated Circuit ($I^2C$) bus in one embodiment of the invention. The PIC controllers use a Harvard architecture in which program and data are accessed from separate memories. This improves bandwidth over traditional von Neumann architecture processors where program and data are fetched from the same memory. Separating program and data memory further allows instructions to be sized differently than the 8-bit wide data word. Instruction opcodes are 14-bit wide making it possible to have all single word instructions. A 14-bit wide program memory access bus fetches a 14-bit instruction in a single cycle.

In one embodiment of the invention, the microcontrollers communicate through an $I^2C$ serial bus, also referred to as a microcontroller bus 160. The document "The $I^2C$ Bus and How to Use It" (Philips Semiconductor, 1992) is hereby incorporated by reference. The $I^2C$ bus is a bidirectional two-wire bus and may operate at a 400 kbps rate. However, other bus structures and protocols could be employed in connection with this invention. For example, Apple Computer ADB, Universal Serial Bus, IEEE-1394 (Firewire), IEEE-488 (GPIB), RS-485, or Controller Area Network (CAN) could be utilized as the microcontroller bus. Control on the microcontroller bus is distributed. Each microcontroller can be a sender (a master) or a receiver (a slave) and each is interconnected by this bus. A microcontroller directly controls its own resources, and indirectly controls resources of other microcontrollers on the bus.

Here are some of the features of the $I^2C$-bus:

Two bus lines are utilized: a serial data line (SDA) and a serial clock line (SCL).

Each device connected to the bus is software addressable by a unique address and simple master/slave relationships exist at all times; masters can operate as master-transmitters or as master-receivers.

The bus is a true multi-master bus including collision detection and arbitration to prevent data corruption if two or more masters simultaneously initiate data transfer.

Serial, 8-bit oriented, bidirectional data transfers can be made at up to 400 kbit/second in the fast mode.

Two wires, serial data (SDA) and serial clock (SCL), carry information between the devices connected to the I²C bus. Each device is recognized by a unique address and can operate as either a transmitter or receiver, depending on the function of the device. For example, a memory device connected to the I²C bus could both receive and transmit data. In addition to transmitters and receivers, devices can also be considered as masters or slaves when performing data transfers (see Table 2). A master is the device which initiates a data transfer on the bus and generates the clock signals to permit that transfer. At that time, any device addressed is considered a slave.

TABLE 2

Definition of I²C-bus terminology

| Term | Description |
| --- | --- |
| Transmitter | The device which sends the data to the bus |
| Receiver | The device which receives the data from the bus |
| Master | The device which initiates a transfer, generates clock signals and terminates a transfer |
| Slave | The device addressed by a master |
| Multi-master | More than one master can attempt to control the bus at the same time without corrupting the message |
| Arbitration | Procedure to ensure that, if more than one master simultaneously tries to control the bus, only one is allowed to do so and the message is not corrupted |
| Synchronization | Procedure to synchronize the clock signal of two or more devices |

The I²C-bus is a multi-master bus. This means that more than one device capable of controlling the bus can be connected to it. As masters are usually microcontrollers, consider the case of a data transfer between two microcontrollers connected to the I²C-bus. This highlights the master-slave and receiver-transmitter relationships to be found on the I²C-bus. It should be noted that these relationships are not permanent, but depend on the direction of data transfer at that time. The transfer of data would proceed as follows:

1) Suppose microcontroller A wants to send information to microcontroller B:
    microcontroller A (master), addresses microcontroller B (slave);
    microcontroller A (master-transmitter), sends data to microcontroller B (slave-receiver);
    microcontroller A terminates the transfer.
2) If microcontroller A wants to receive information from microcontroller B:
    microcontroller A (master addresses microcontroller B (slave);
    microcontroller A (master-receiver) receives data from microcontroller B (slave-transmitter);
    microcontroller A terminates the transfer.

Even in this situation, the master (microcontroller A) generates the timing and terminates the transfer.

The possibility of connecting more than one microcontroller to the I²C-bus means that more than one master could try to initiate a data transfer at the same time. To avoid the chaos that might ensue from such an event, an arbitration procedure has been developed. This procedure relies on the wired-AND connection of all I²C interfaces to the I²C-bus.

If two or more masters try to put information onto the bus, the first to produce a 'one' when the other produces a 'zero' will lose the arbitration. The clock signals during arbitration are a synchronized combination of the clocks generated by the masters using the wired-AND connection to the SCL line.

Generation of clock signal on the I²C-bus is the responsibility of master devices. Each master microcontroller generates its own clock signals when transferring data on the bus.

The command, diagnostic, monitoring and history functions of the microcontroller network 102 are accessed using a global network memory model in one embodiment. That is, any function may be queried simply by generating a network "read" request targeted at the function's known global network address. In the same fashion, a function may be exercised simply by "writing" to its global network address. Any microcontroller may initiate read/write activity by sending a message on the I²C bus to the microcontroller responsible for the function (which can be determined from the known global address of the function). The network memory model includes typing information as part of the memory addressing information.

Using a network global memory model in one embodiment places relatively modest requirements for the I²C message protocol.

All messages conform to the I²C message format including addressing and read/write indication.

All I²C messages use seven bit addressing.

Any controller can originate (be a Master) or respond (be a Slave).

All message transactions consist of I²C "Combined format" messages. This is made up of two back-to-back I²C simple messages with a repeated START condition between (which does not allow for re-arbitrating the bus). The first message is a Write (Master to Slave) and the second message is a Read (Slave to Master).

Two types of transactions are used: Memory-Read and Memory-Write.

Sub-Addressing formats vary depending on data type being used.

IV. REMOTE INTERFACE BOARD

Figure 3:
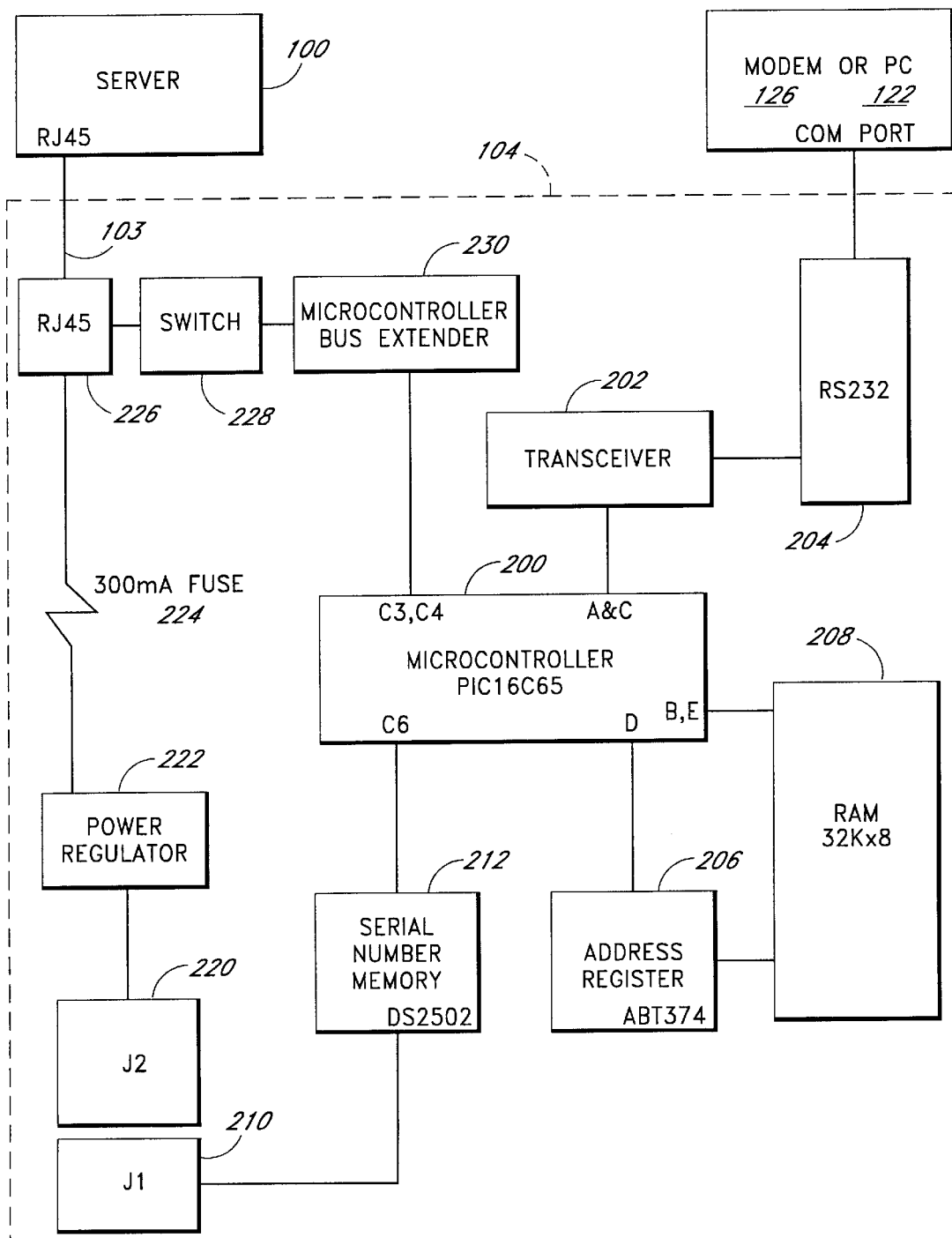
FIG. 3 is a block diagram of one embodiment of a remote interface board (RIB) that is part of the microcontroller network shown in FIGS. 1 and 2.

Referring to FIG. 3, the remote interface board (RIB) 104, previously shown in FIG. 1, will now be described. The RIB is an interface between the microcontroller network 102 (FIG. 1) of the server system 100 and an external client computer 122/124. The server system status and commands are passed through the RS232 connector port 204 at the client side of the RIB to the microcontroller network 102 on the server 100, controlled through the on-board PIC16C65 microcontroller 200. Signals in the microcontroller network 102 are transported by the microcontroller bus 160 (FIG. 2). In one embodiment, the microcontroller bus 160 utilizes the I²C bus protocol, previously described. The signals on the microcontroller bus 160 are received from the server 100 by the RIB 104 on the RJ-45 cable 103 and are translated by the PIC16C65 microcontroller 200 into an eight signal RS232 protocol. These RS232 signals are passed through a RS232 line transceiver 202, such as a LT1133A chip available from Linear Technology, with a baud rate capable of reaching the speed of 120 kbaud. A 25 pin D-Sub connector 204 connects to the other side of the line transceiver 202 and provides the point at which either the local client computer 122 or the server modem 126 makes a connection.

The two wire microcontroller bus 160 is brought in from the server 100 and passed to the microcontroller 200 using the RJ-45 cable 103 and RJ-45 connector 226. A switch 228, such as a QS3126 switch available from Quick Logic, connects to the RJ-45 connector 226 and provides isolation for the data and clock bus signals internal and external to the RIB 104. If the RIB 104 and switch 228 have power, the switch 228 feeds the bus signals through to a microcontroller bus extender 230. Otherwise, if the switch 228 does not have power, the microcontroller bus 160 is isolated from the RIB 104. The bus extender 230 connects between the switch 228 and the microcontroller 200. The bus extender 230 is a buffer providing drive capability for the clock and data signals. In one embodiment, the bus extender 230 is a 82B715 chip available from Philips Semiconductor. Microcontroller 200 Port C, bit 3 is the clocking bit and Port C, bit 4 is the data line.

Communication with the server modem 126 is based on the RS232 protocol. The microcontroller 200 generates the receive and the transmit signals, where the signal levels are transposed to the RS232 levels by the LT1133A line transceiver 202. There are three transmit signals, RTS, SOUT and DTR, which are from Port A, bits 2, 3 and 4 of the microcontroller 200, whereas the five receive signals are from two ports, DCD, DSR from Port C, bits 1 and 0 and SIN, CTS and RI from Port A, bits 5, 0 and 1.

In one embodiment the 25 pin RS232 pin connector 204 is used instead a 9 pin connector, since this type of connector is more common than the other. All the extra pins are not connected except the pins 1 and 7, where pin 1 is chassis ground and pin 7 is a signal ground.

A static random access memory (SRAM) 208 connects to the microcontroller 200. In one embodiment, the SRAM 208 is a 32k×8 MT5LC2568 that is available from Micron Technology. The SRAM 208 is also available from other memory manufacturers. An external address register 206, such as an ABT374, available from Texas Instruments is used for latching the higher addressing bits (A8–A14) of the address for the SRAM 208 so as to expand the address to fifteen bits. The SRAM 208 is used to store system status data, system log data from the NVRAM 112 (FIG. 1), and other message data for transfer to the external interface port 204 or to a microcontroller on the microcontroller bus 160 (FIG. 2).

Port D of the microcontroller 200 is the address port. Port B is the data bus for the bi-directional data interconnect. Port E is for the SRAM enable, output tristate and write control signals. The microcontroller 200 operates at a frequency of 12 MHz.

A Erasable Programmable Read Only Memory (EPROM) 212 is used for storing board serial number identification information for the RIB 104. The serial number memory 212 is signal powered, retaining the charge into a capacitor sourced through the data line. In one embodiment, the serial number memory 212 stores eight sixteen-byte serial/revision numbers (for maintaining the rework/revision history) and is a DS2502 chip available from Dallas Semiconductor. The programming of memory 212 is handled using a jumper applied through an external connector JI 210. The serial number memory 212 connects to the microcontroller 200 at Port C, bit 6 and to the external connector JI 210.

The RIB 104 may be powered through a 7.5 Volt/800 mA supply unit that plugs into a connector J2 220. In one embodiment, the supply unit is 120 Volt AC to DC wall adapter. Connector J2 220 feeds a LT1376 high frequency switching regulator 222, available from Linear Technology, which regulates the power source. The regulated power output is used locally by the components on the RIB 104, and 300 mA are sourced to the microcontroller network 102 through a 300 mA fuse 224 and the RJ-45 connector 226. Thus, the output of the regulator 222 provides an alternative source for a bias-powered partition of the microcontroller network 102. The bias-powered partition includes the system recorder 110 (FIG. 1), the NVRAM 112 and the Chassis controller 170 (FIG. 2) which are resident on the server backplane 152.

V. REMOTE INTERFACE SERIAL PROTOCOL

The microcontroller network remote interface serial protocol communicates microcontroller network messages across a point-to-point serial link. This link is between the RIB controller 200 that is in communication with the Recovery Manager 130 at the remote client 122/124. This protocol encapsulates microcontroller network messages in a transmission packet to provide error-free communication and link security.

In one embodiment, the remote interface serial protocol uses the concept of byte stuffing. This means that certain byte values in the data stream have a particular meaning. If that byte value is transmitted by the underlying application as data, it must be transmitted as a two-byte sequence.

The bytes that have a special meaning in this protocol are:

| | |
|---|---|
| SOM 306 | Start of a message |
| EOM 316 | End of a message |
| SUB | The next byte in the data stream must be substituted before processing. |
| INT 320 | Event Interrupt |
| Data 312 | An entire microcontroller network message |

As stated above, if any of these byte values occur as data in a message, a two-byte sequence must be substituted for that byte. The sequence is a byte with the value of SUB, followed by a type with the value of the original byte, which is incremented by one. For example, if a SUB byte occurs in a message, it is transmitted as a SUB followed by a byte that has a value of SUB+1.

Figure 4:
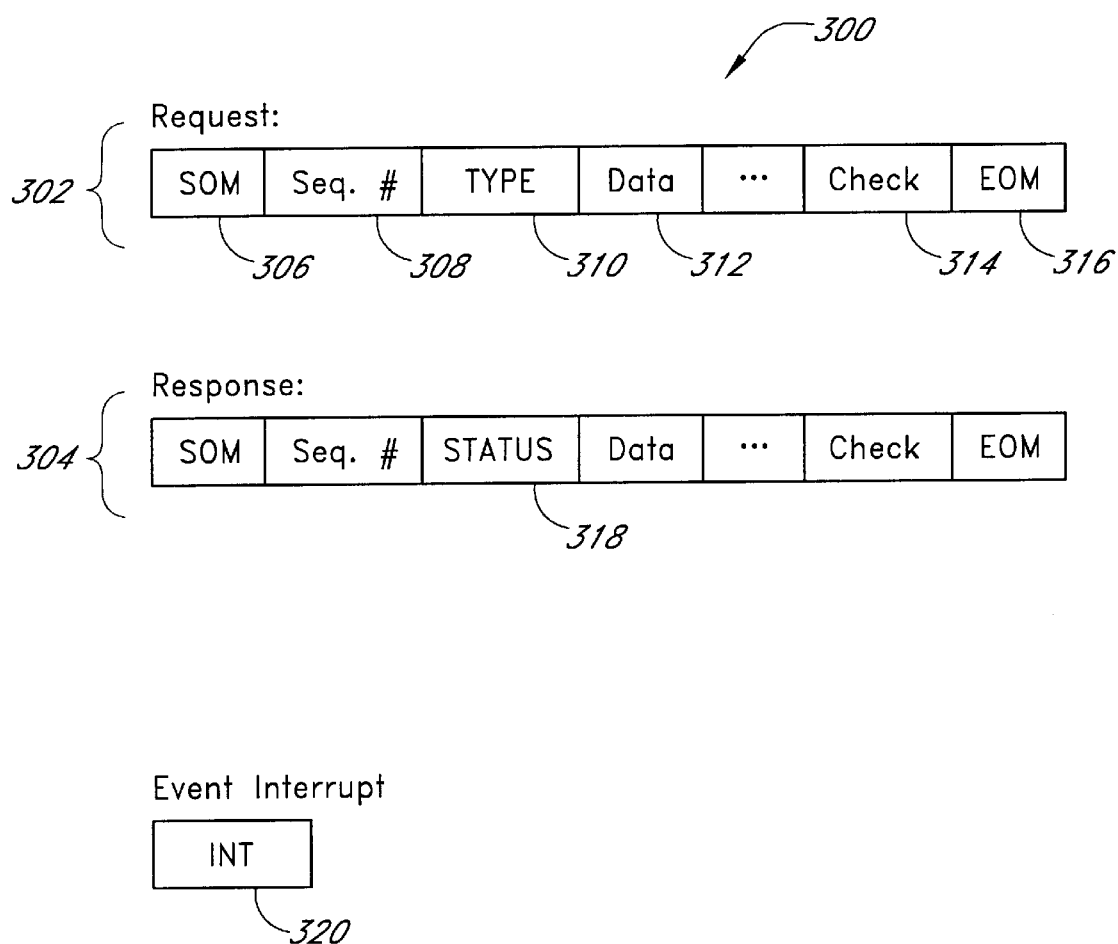
FIG. 4 is a diagram of one embodiment of a serial protocol message formats utilized by the RIB shown in FIG. 3.

Referring to FIG. 4, the two types of messages 300 used by the remote interface serial protocol will be described.

1. Requests 302, which are sent by remote management (client) computers 122/124 (FIG. 1) to the remote interface 104.
2. Responses 304, which are returned to the requester 122/124 by the remote interface 104.

The fields of the messages are defined as follows:

| | |
|---|---|
| SOM 306 | A special data byte value marking the start of a message. |
| EOM 316 | A special data byte value marking the end of a message. |
| Seq.# 308 | A one-byte sequence number, which is incremented on each request. It is stored in the response. |
| TYPE 310 | One of the following types of requests: |
| IDENTIFY | Requests the remote interface to send back identification information about the system to which it is connected. It also resets the next expected sequence number. Security authorization does not need to be established before the request is issued. |

| | |
|---|---|
| SECURE | Establishes secure authorization on the serial link by checking password security data provided in the message with the microcontroller network password. |
| UNSECURE | Clears security authorization on the link and attempts to disconnect it. This requires security authorization to have been previously established. |
| MESSAGE | Passes the data portions of the message to the microcontroller network for execution. The response from the microcontroller network is sent back in the data portion of the response. This requires security authorization to have been previously established. |
| POLL | Queries the status of the remote interface. This request is generally used to determine if an event is pending in the remote interface. |
| STATUS 318 | One of the following response status values: |
| OK | Everything relating to communication with the remote interface is successful. |
| OK_EVENT | Everything relating to communication with the remote interface is successful. In addition, there is one or more events pending in the remote interface. |
| SEQUENCE | The sequence number of the request is neither the current sequence number or retransmission request, nor the next expected sequence number or new request. Sequence numbers may be reset by an IDENTIFY request. |
| CHECK | The check byte in the request message is received incorrectly. |
| FORMAT | Something about the format of the message is incorrect. Most likely, the type field contains an invalid value. |
| SECURE | The message requires that security authorization be in effect, or, if the message has a TYPE value of SECURE, the security check failed. |
| Check 314 | Indicates a message integrity check byte. Currently the value is 256 minus the sum of previous bytes in the message. For example, adding all bytes in the message up to and including the check byte should produce a result of zero (0). |
| INT 320 | A special one-byte message sent by the remote interface when it detects the transition from no events pending to one or more events pending. This message can be used to trigger reading events from the remote interface. Events should be read until the return status changes form OK_EVENT to OK. |

VI. MICROCONTROLLER NETWORK BIAS POWER

There are two separate 5 voltpower sources associated with the server system 100: a 5 voltbias power that is supplied to the Chassis controller 170 (FIG. 2) and the System Recorder 110 by a server power supply whenever AC power is enabled, and a 5 Volt (5V) general or main power that is also provided by the server power supply. Bias power is considered to be low current (generally less than one Amp, e.g., 300 mA) but has less delay than general power when the supply is initially turned on. General 5V power is controlled through the Chassis controller 170. When the server system 100 is down, i.e., the general 5V power is off, the microcontroller network 102 (FIG. 1) is still electronically responsive via the remote interface board 104 to the Chassis controller 170 and System Recorder 110. Commands can be issued from a software application running on the local client computer 122 or remote client computer 124 to turn on the general 5V power, read the system log, check system type, and so forth.

When the general 5V power is off at the server 100, the 5V bias power supplied by the server power supply will also be off. However, as long as the independent power supply 360 located at the remote interface 104 is operational, the remote interface board provides the 5V bias power and sends it via the RJ-45 cable 103 (FIG. 1) to the Chassis controller 170 and the System Recorder 110 on the microcontroller network 102. This power supply 360 could be a battery, or an AC/DC adapter or any other source of electrical power.

Figure 5:
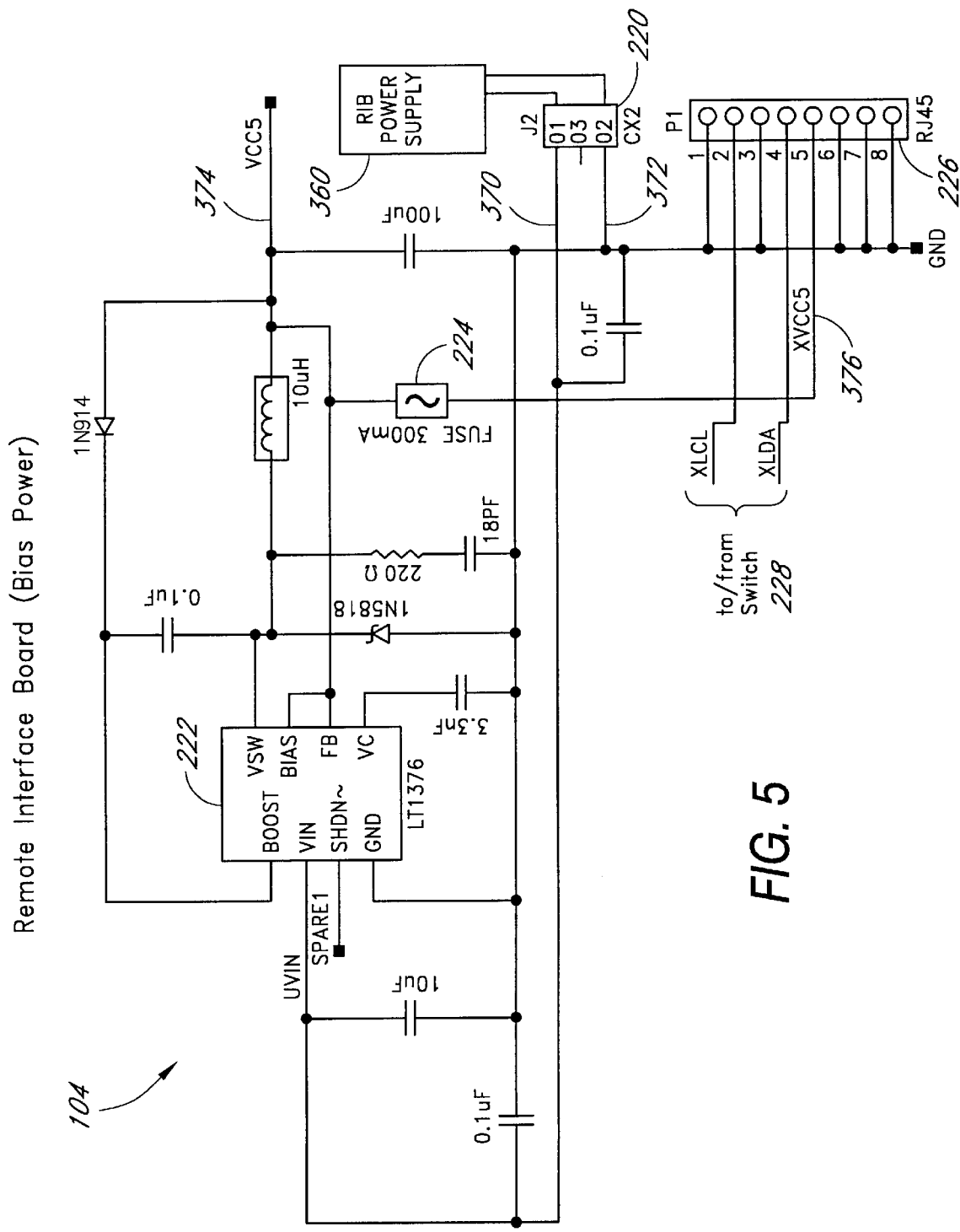
FIG. 5 is a schematic diagram of a bias power portion of the RIB shown in FIG. 3.

Referring to FIG. 5, the bias power portion of the remote interface board 104 will be described. As previously described, the independent RIB power supply 360, such as a 120 Volt AC/7.5 Volt DC power adapter, is connected to the DC power connector J2 220. Pin 1 of the connector J2 connects via line 370 to provide the DC voltage to a VIN pin of the LT1376 high frequency step-down switching regulator 222. Pin 2 of the connector J2 connects to ground via line 372. The regulator 222, along with the external components suggested in the data sheet for the Linear Technology LT1376 component, provides a positive 5V output on a VCC5 line 374. The VCC5 line 374 connects to the other components on the RIB 104 to provide power to each RIB component. The VCC5 line 374 also connects to a fuse 224. In one embodiment the fuse 224 may be rated at 300 milliAmperes. The fuse 224 further connects via XVCC5 line 376 to pin 5 of RJ-45 connector 226, thereby providing 300 mA, positive 5V bias power to be fed to the server microcontroller network 102 (FIG. 1). The extender microcontroller bus clock (XLCL) and data (XLDA) signals to/from the switch 228 (FIG. 3) also connect to the RJ-45 connector 226 at pins 2 and 4, respectively. These signals correspond to I²C clock and data signals.

Figure 6:
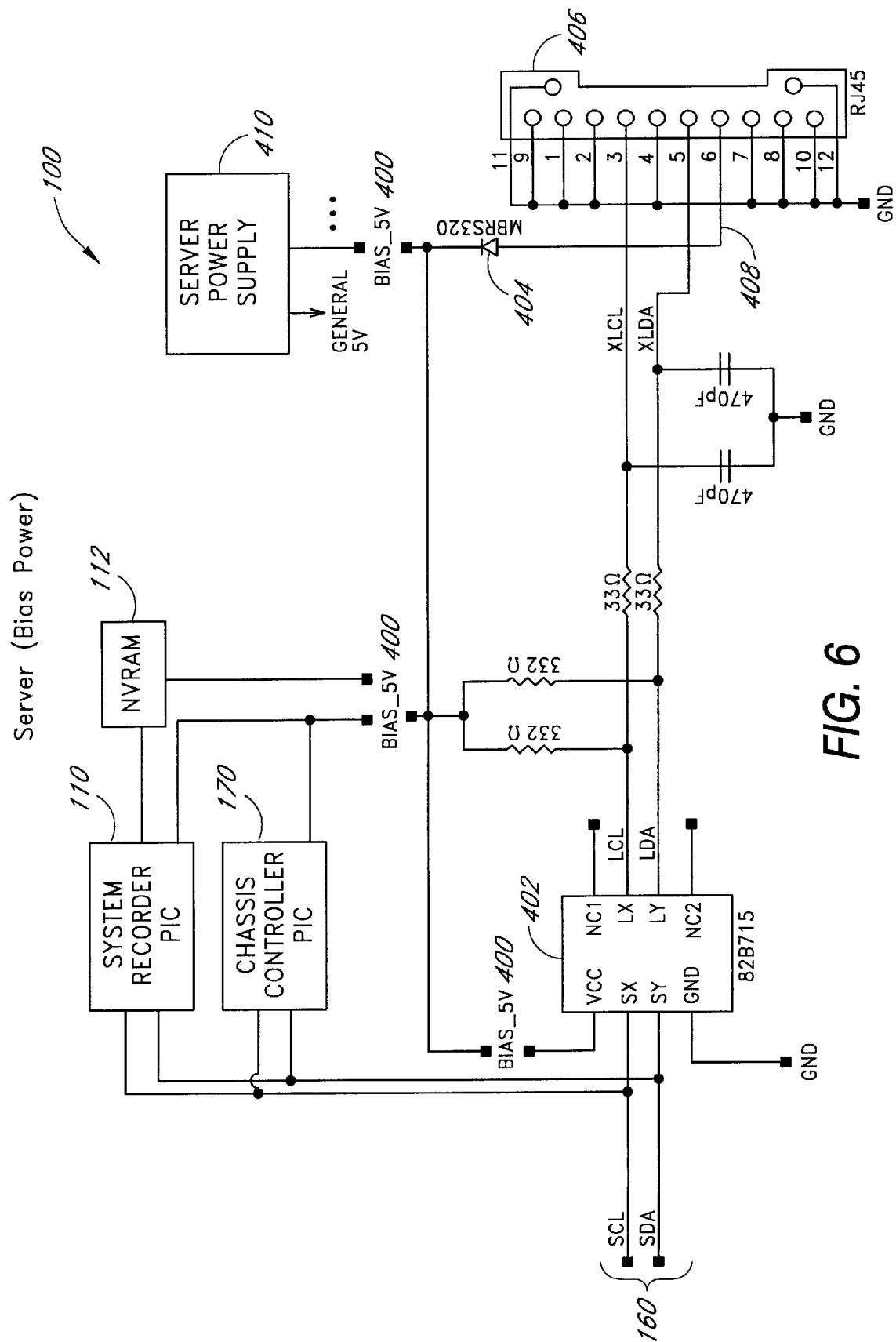
FIG. 6 is a schematic diagram of a bias power portion of the server system board in the server system of FIG. 2.

Referring to FIG. 6, the bias power portion of the server 100 will now be described. The bias power portion of the server is generally located at the backplane 152 (FIG. 2).

The RJ-45 cable 103 (FIG. 1) interconnects the RJ-45 connector 226 (FIG. 5) and a RJ-45 connector 406 at the server 100. Pin 5 of the RJ-45 connector 406 provides the 300 mA, positive 5V bias power from the RIB 104 on a line 408. The line 408 feeds the anode side of a diode 404. In one embodiment, the diode is a type MBRS320. The cathode side of diode 404 is the BIAS_5V power 400 for selected components of the server 100. The selected components include the Chassis controller 170, the System Recorder 110 and the NVRAM 112 as shown in FIG. 6. Other components closely affiliated with the Chassis controller 170 and System Recorder 110 are also powered by the bias power. Of course, in other embodiments, other components of the diagnostic network 102 or of the server 100 could be fed power by the RIB 104 via its independent power supply 360.

The diode 404 prevents the 5V bias power from the server power supply 410 from being supplied to the RIB 104 via the RJ-45 cable 103. However, when the server power supply is off, the bias power from the RIB 104 flows on line 408 through diode 404 to supply the bias power driven components of the server 100. In addition, when the server 5V bias power is below a nominal voltage, the RIB supplied bias power engages to brings the bias_5V voltage up to 5V.

The extender microcontroller bus clock (XLCL) and data (XLDA) signals link to a microcontroller bus extender circuit 402. The bus extender 402 is a buffer providing drive capability for the clock and data signals. In one embodiment, the bus extender 402 is a 82B715 chip available from Philips Semiconductor. The outputs of the bus extender 402 are the serial clock (SCL) and serial data (SDA) signals of the microcontroller bus 160. These two signals on the microcontroller bus 160 connect to the Chassis controller 170 and System Recorder 110, as previously described.

An example of using the independent powering aspect of the server system 100 will now be described. In the event of a server failure where the server power supply 410 is off, the server 5V bias power is not available for the server components. When this situation occurs, the RIB 104 supplies the bias power to the bias powered components on the server. The loss of power by the server power supply 410 is reported as an event by the Chassis controller 170 (which is powered by the RIM supplied bias power) to the RIB microcontroller 200 (FIG. 3) via the microcontroller network 102. This event is sent to the Recovery Manager 130 (FIG. 1) so as to be displayed to a user of the client computer 122/124. The user may then elect to view the system log in the NVRAM 112 by use of the Recovery Manager 130 at the client computer 122/124 to determine the cause of the problem. After diagnosing the server problem, the user may then decide to power up the server by issuing a power up command through the Recovery Manager 130 to the Chassis controller 170. The Chassis controller 170 then powers up the server power supply 410 to restore general power to the server system.

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention.

What is claimed is:

1. A system for independent powering of a first computer, comprising:
   a first computer storing status information;
   a first computer power supply that supplies power to the first computer;
   a remote interface power supply that is independent from the first computer power supply; and
   a remote interface circuit that receives power from the remote interface power supply so as to power at least a computational device in the remote interface circuit and is configured to provide independent power to only a portion of the first computer to facilitate reading of the status information.

2. The system defined in claim 1, additionally comprising a second computer in data communication with the first computer through the remote interface circuit.

3. The system defined in claim 2, wherein the second computer displays the status information.

4. The system defined in claim 1, wherein the independent power provided by the remote interface circuit is isolated from the first computer power supply by a diode.

5. The system defined in claim 1, wherein the independent power supply includes an AC to DC adapter.

6. The system defined in claim 1, wherein the status information is stored in a system log.

7. The system defined in claim 6, wherein the system log is stored in a non-volatile, random access memory (NVRAM).

8. The system defined in claim 7, wherein the NVRAM is accessed by a microcontroller.

9. The system defined in claim 1, wherein independent power is provided to the first computer when the first computer power supply is off.

10. The system defined in claim 1, wherein independent power is provided to the first computer when the first computer power supply is inoperable or operating below a threshold power level.

11. The system defined in claim 1, wherein the portion of the first computer includes a microcontroller.

12. A system for independent powering of a first computer, comprising:
    a first computer storing status information;
    a first computer power supply that supplies power to the first computer;
    a remote interface power supply, wherein the remote interface power supply provides power that is independent of the power supplied by the first computer power supply; and
    a remote interface circuit that receives the power from the remote interface power supply so as to power at least a computational device in the remote interface circuit and is configured to provide the independent power to only a portion of the first computer.

13. The system defined in claim 12, wherein the independent power facilitates reading of the status information when the first computer power supply is inoperable or operating below a threshold power level.

14. The system defined in claim 12, wherein the portion of the first computer includes a microcontroller.

15. A system for independent powering of a computer, comprising:
    a first computer having a first computer power supply; and
    a remote interface circuit that receives power from a power supply that is independent from the first computer power supply so as to power at least a computational device in the remote interface circuit and provides independent power to only a portion of the first computer if the first computer power supply is inoperable or operating below a threshold power level.

16. The system defined in claim 15, wherein the portion of the first computer includes a microcontroller.

17. The system defined in claim 16, wherein the remote interface circuit includes a remote interface microcontroller connected by a bus to the microcontroller in the first computer.

18. The system defined in claim 15, additionally comprising a second computer in data communication with the first computer through the remote interface circuit.

19. The system defined in claim 18, wherein the second computer remotely turns on the first computer power supply through the remote interface circuit, wherein a command is received by the remote interface circuit and the computational device executes the command.

20. The system defined in claim 15, wherein the power provided by the remote interface circuit is isolated from the first computer power supply by a diode.

21. A system for independent powering of a first computer, comprising:
  a first computer storing status information and having a system processor;
  a first computer power supply that supplies power to the first computer;
  a remote interface power supply that is independent from the first computer power supply; and
  a remote interface circuit that receives power from the remote interface power supply and is configured to provide independent power to at least a portion of the first computer to facilitate reading of the status information without the system processor being powered.

22. The system defined in claim 21, additionally comprising a second computer connected to the first computer through the remote interface circuit.

23. The system defined in claim 22, wherein the second computer displays the status information.

24. A system for independent powering of a computer, comprising:
  a first computer having a first computer power supply and having a system processor; and
  a remote interface circuit that receives power from a power supply that is independent from the first computer power supply and provides independent power to at least a portion of the first computer, without powering the system processor, if the first computer power supply is inoperable or operating below a threshold power level.

* * * * *

UNITED STATES PATENT AND TRADEMARK OFFICE
CERTIFICATE OF CORRECTION

PATENT NO. : 6,202,160 B1  Page 1 of 1
DATED : March 13, 2001
INVENTOR(S) : Sheikh et al.

It is certified that error appears in the above-identified patent and that said Letters Patent is hereby corrected as shown below:

Column 15,
Line 44, please change "voltbias" to -- volt bias --.

Signed and Sealed this

Seventh Day of May, 2002

Attest:

Attesting Officer

JAMES E. ROGAN
Director of the United States Patent and Trademark Office